Oct. 9, 1951   J. L. CALIRI   2,570,762
SOLDERING GUN
Filed Dec. 13, 1948   2 Sheets-Sheet 1
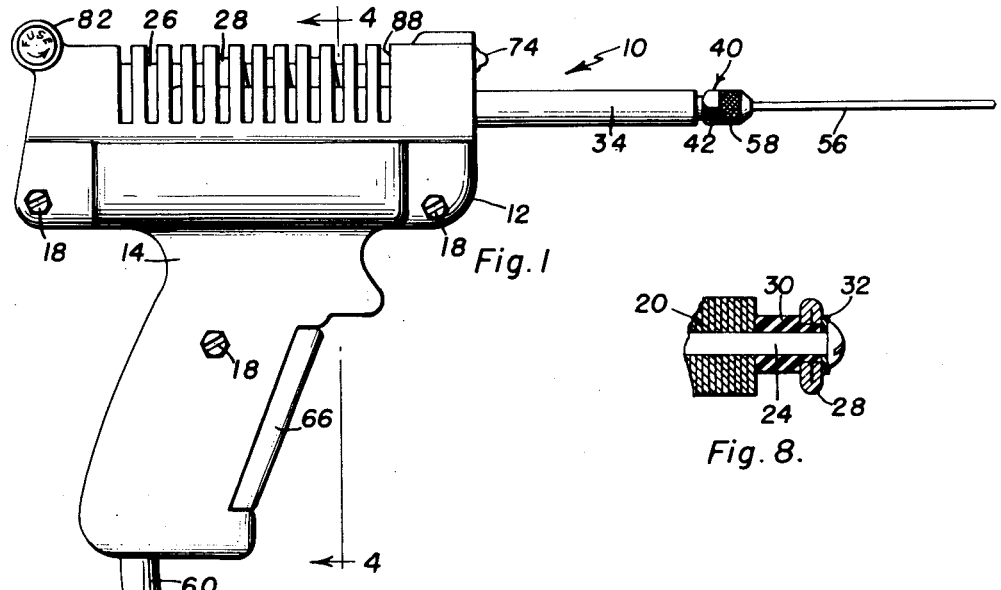
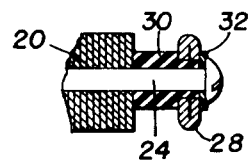
Fig. 8.
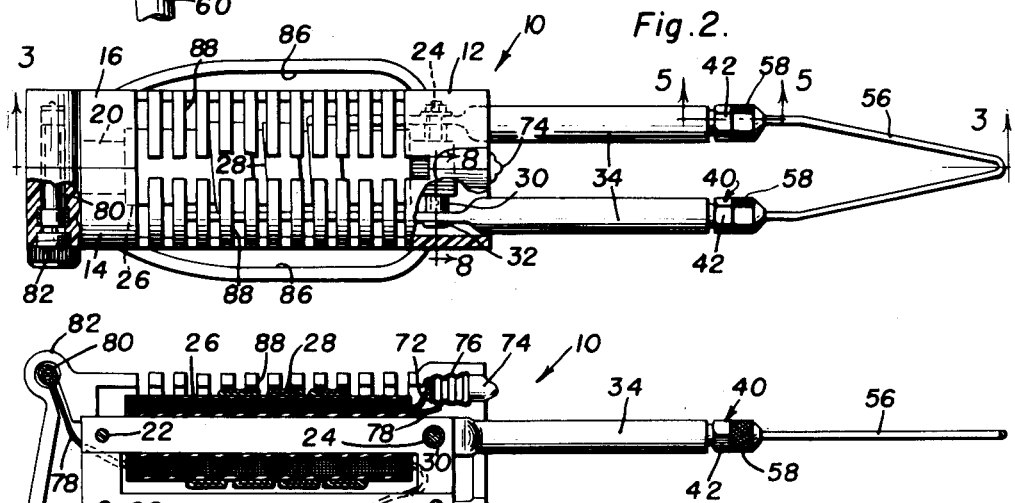
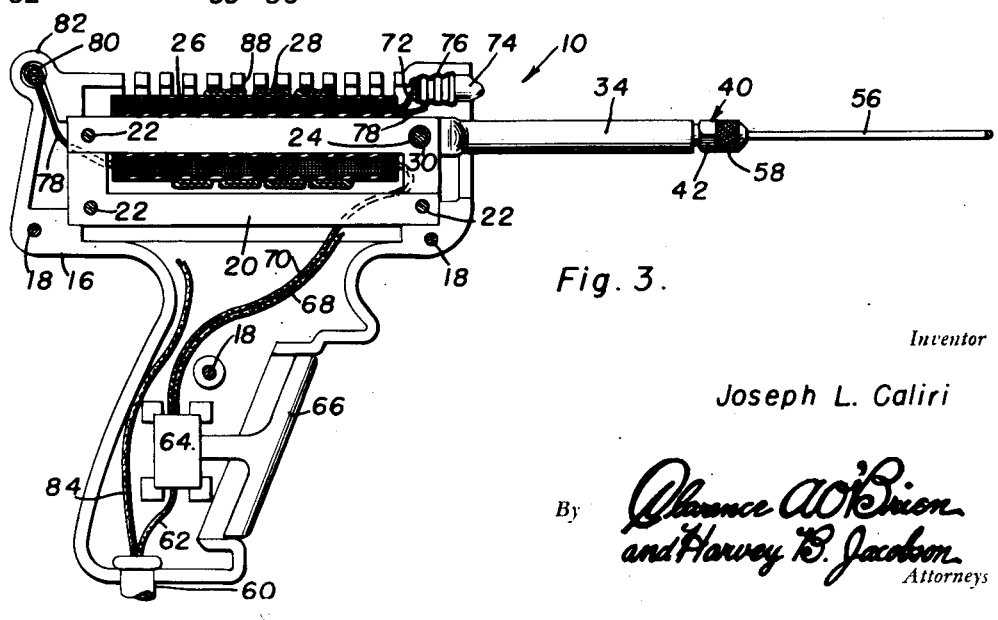
Inventor
Joseph L. Caliri
By *Clarence A. O'Brien and Harvey B. Jacobson*
Attorneys Oct. 9, 1951     J. L. CALIRI     2,570,762
SOLDERING GUN
Filed Dec. 13, 1948     2 Sheets-Sheet 2
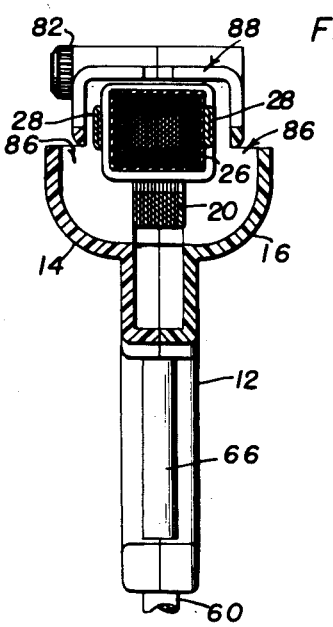
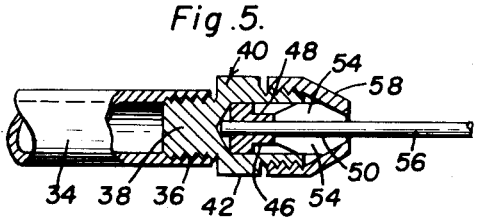
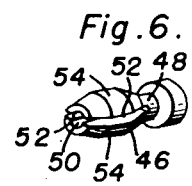
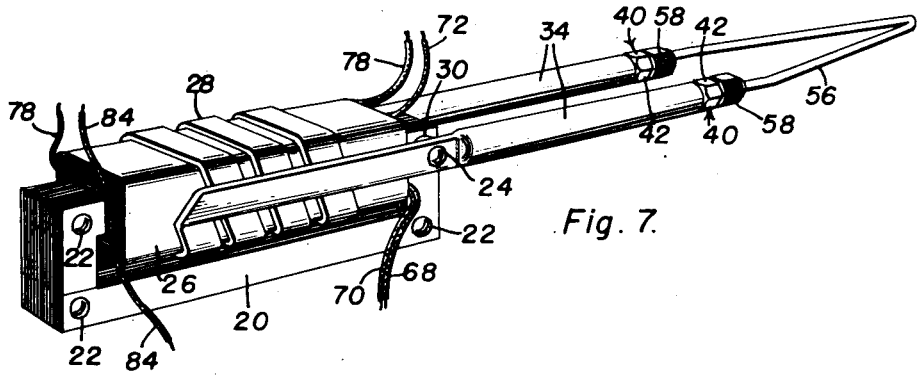
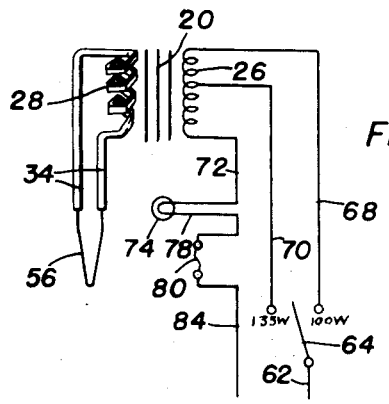
Inventor
Joseph L. Caliri
By *Clarence A. O'Brien and Harvey B. Jacobson*
Attorneys Patented Oct. 9, 1951

2,570,762

UNITED STATES PATENT OFFICE 2,570,762

SOLDERING GUN

Joseph L. Caliri, Orange, N. J., assignor, by mesne assignments, to Caliri Manufacturing Co., Inc., Lawrence, Mass., a corporation of Massachusetts Application December 13, 1948, Serial No. 64,993

2 Claims. (Cl. 219—26)

This invention relates to new and useful improvements and structural refinements in soldering guns, and in particular the invention concerns itself with that type of a soldering iron which, for purposes of convenient handling, assumes the configuration of a pistol or gun, and in which a work-engaging electrode is heated by the secondary circuit of a step-down transformer, the secondary circuit of the latter being bridged or closed by the electrode so that the latter is heated as long as the transformer is in operation.

The principal object of the invention is to provide a soldering gun of this character which is extremely simple but highly durable in construction, which may be economically manufactured and conveniently assembled and wherein various precautions are taken to prevent overheating or other damage arising from inadvertence, accident or mistake.

An important feature of the invention involves the provision of electrode holders which actually constitute integral extensions of the secondary circuit of the transformer, and another feature of the invention lies in the particular means for securely fastening this secondary circuit-forming member to the transformer itself so as to provide an integral unit which, as a whole, may be conveniently removed from the housing of the soldering gun if an occasion to do so arises.

An additional feature of the invention resides in the provision of what may be referred to as a pilot light on the soldering gun housing, this light or lamp performing a double function, namely, that of illuminating the work when the soldering gun is being used, and indicating to the operator when the gun is laid aside without shutting off the electric current thereto.

With the above more important objects and features in view and such other objects and features as may become apparent as this specification proceeds, the invention consists essentially of the construction and arrangement of parts as shown in the accompanying drawings in which:

Figure 1 is a side elevational view of the invention,

Figure 2 is a top plan view thereof, the same being partially broken away so as to reveal its construction, Figure 3 is a cross sectional view, taken substantially in the plane of line 3—3 in Figure 2, Figure 4 is a cross sectional view, taken substantially in the plane of the line 4—4 in Figure 1, Figure 5 is a fragmentary cross sectional view, taken substantially in the plane of the line 5—5 in Figure 2, Figure 6 is a perspective view of one of the electrode receiving collets used in the invention, Figure 7 is a perspective view of the combined transformer and electrode holding unit, Figure 8 is a fragmentary cross-sectional view, taken substantially in the plane of the line 8—8 in Figure 2 with the housing of the gun removed, and Figure 9 is a wiring diagram of the electrical components used in the invention.

Like characters of reference are employed to designate like parts in the specification and throughout the several views.

Referring now to the accompanying drawings in detail, the invention consists of a soldering gun designated generally by the reference character 10, the same embodying in its construction a pistol-shaped housing 12 consisting of a pair of separable, complementary half sections 14, 16 which are secured together by transversely extending bolts 18, as will be clearly apparent.

The housing 12 is preferably formed from molded plastic material, and is adapted to receive therein a combined step-down transformer and an electrode holding unit, this being shown in its entirety in Figure 7. The transformer portion of this unit is built around one side of an open, laminated transformer core 20, the laminations of this core being secured together by transversely extending bolts 22, 24. The primary winding 26 of the step-down transformer is wound around one of the sides of the core 20, and since the sides of the core are of a rectangular cross-sectional configuration, the winding 26 assumes a similar cross-sectional form.

The secondary circuit of the transformer assumes the form of a tubular member which has the intermediate portion thereof flattened and coiled in a helical manner around the primary winding 26 as indicated at 28.

It is to be noted that the flattened, intermediate portion 28 of the secondary circuit-forming member encircles the primary winding 26 in such manner that it is firmly retained in position thereon by the rectangular cross-sectional configuration of the primary winding, and it will be also observed that the end regions of the flattened portion 28 are firmly secured to the transformer core 20 by the aforementioned screw 24, suitable insulating bushings 30 and insulating washers 32 being employed for insulating the secondary circuit-forming member from the transformer core 20, as is best shown in Figures 2 and 8.

The tubular end portions of the secondary circuit-forming member constitute integral continuations of the flattened portion 28 and project outwardly from the housing 12 in spaced parallel relation, so as to provide what may be referred to as a pair of electrode holders 34.

The outer end portion of each of these holders is internally screw-threaded as at 36 (see Fig. 5) to receive an externally screw-threaded portion of an adapter 38 which constitutes a component of an electrode socket, designated generally by the reference character 40.

The adapter 38 is formed with a polygonal portion 42 to receive a suitable wrench, or the like, whereby the socket may be tightened into position, and it is to be observed that the adapter 38 is also formed with an axial bore to receive what may be referred to as a collet 46. As is best shown in Figure 5 and also in Figure 6, an intermediate portion of this collet is diametrically reduced, as at 48, while an end portion thereof is formed with an electrode-receiving bore 50 and is also provided with a set of longitudinally extending slits 52 which separate it into a plurality of resilient jaws 54. The bore 50 of the collet 46 is adapted to removably receive therein an end portion of a substantially U-shaped or V-shaped electrode 56, and a clamping nut 58, having a substantially frusto-conical configuration, is provided on the adapter 38 and is intended to bear against the jaws 54 in such manner that the jaws may be brought into frictional engagement with the electrode 56 by tightening the nut 58, in order to firmly yet removably retain the electrode in position.

Needless to say, each end portion of the electrode 56 is intended to be secured in the socket of one of the electrode holders 34, and by virtue of this arrangement the electrode 56 bridges or closes the secondary circuit of the transformer, so that as long as the transformer is in operation the electrode 56 will be heated. It may be explained at this point that if the electrode becomes burnt or otherwise damaged, it may be readily replaced by simply loosening the clamping nuts 58 and inserting a new electrode in the collets 46 of the sockets 40.

Electric current is delivered to the soldering gun by means of a conductor 60 which enters the housing 12 and has one wire 62 thereof connected to a double acting switch 64 which is controlled by a depressible trigger 66 provided on the housing of the soldering gun. The switch 64 is a two-position switch having two terminals connected, as at 68 and 70, to different points of the primary transformer winding 26, whereby the power output of the transformer may be varied for low or high power output, as desired. The return from the primary winding 26 of the transformer is indicated at 72 and passes in series through a lamp 74 which is positioned in a suitable socket 76 mounted in the housing 12 between and somewhat above the electrode holders 34. The return from the lamp 74 is made by a conductor 78 to a fuse 80 which is mounted in a suitable fuse holder 82 provided at the rear end portion of the housing 12. Thereupon, the current is returned by a wire 84 into the conductor 60, as will be clearly apparent from Figure 9.

It will be observed from the foregoing that the lamp 74 as well as the fuse 80 are wired in series with the primary winding 26 of the transformer, so that the lamp 74 will indicate to the user of the soldering gun when the transformer is energized. Moreover, the lamp 74 is focused in the region of the electrode 56 so as to illuminate the work, whereby the lamp actually performs a double function. The fuse 80 is, of course, provided to prevent possible overheating or similar damage to the soldering gun if the latter is laid aside for a considerable period of time without shutting off the supply of current and in order to further safeguard against any possibility of such overheating, the housing sections 14, 16 are provided at the sides thereof with suitable openings 86, 88 to facilitate ventilation.

It is believed that the advantages and use of the invention will be clearly apparent from the foregoing disclosure and, accordingly, further description thereof at this point is deemed unnecessary.

Having described the invention, what is claimed as new is:

1. A combined transformer and electrode holding unit for soldering guns, comprising a laminated core including an elongated core member, a substantially tubular primary circuit coil provided on said core member, a secondary circuit forming element consisting of a single piece of material having a pair of spaced parallel tubular end portions and a flat intermediate portion wound to provide a helix and a pair of flat connecting regions extending from the ends of said helix to the respective tubular end portions, said helix being positioned on said coil with said tubular end portions projecting outwardly from said core, said flat connecting regions being disposed in spaced relation at the opposite sides of one end portion of said core member, an insulated fastening element extending transversely through said core member and said connecting regions, and a pair of spacers provided on said fastening element between the core member and the respective connecting regions, said tubular end portions being substantially parallel to the axis of said helix, and sockets provided at the outer ends of said tubular end portions for connecting an electrode thereto.

2. The device as defined in claim 1 wherein the outer ends of said tubular end portions are internally screw-threaded, said sockets comprising a screw-threaded adapter secured in the screw-threaded ends of said tubular end portions, a split electrode receiving collet positioned in each adapter and including a set of gripping jaws, and a clamping nut provided on said adapter and engaging said jaws for urging the latter in frictional engagement with an electrode.

JOSEPH L. CALIRI.

REFERENCES CITED

The following references are of record in the file of this patent:

UNITED STATES PATENTS

| Number | Name | Date |
| --- | --- | --- |
| 1,553,843 | Adams | Sept. 15, 1925 |
| 1,993,961 | Groven et al. | Mar. 12, 1935 |
| 2,405,866 | Weller | Aug. 13, 1946 |

FOREIGN PATENTS

| Number | Country | Date |
| --- | --- | --- |
| 556,609 | Great Britain | Oct. 13, 1943 |